US007802465B2

(12) United States Patent
Issel

(10) Patent No.: US 7,802,465 B2
(45) Date of Patent: Sep. 28, 2010

(54) COLLECTING CONDUIT, APPARATUS AND METHOD FOR LEAKAGE MONITORING AND LEAKAGE LOCATION

(75) Inventor: Wolfgang Issel, Karlsruhe (DE)

(73) Assignee: Areva NP GmbH, Erlangen (DE)

( * ) Notice: Subject to any disclaimer, the term of this patent is extended or adjusted under 35 U.S.C. 154(b) by 390 days.

(21) Appl. No.: 11/649,387

(22) Filed: Jan. 3, 2007

(65) Prior Publication Data

US 2007/0119238 A1 May 31, 2007

Related U.S. Application Data

(63) Continuation of application No. PCT/EP2006/000994, filed on Feb. 4, 2006.

(30) Foreign Application Priority Data

Feb. 22, 2005 (DE) ....................... 10 2005 007 988

(51) Int. Cl.
*G01M 3/04* (2006.01)

(52) U.S. Cl. ....................................................... 73/40.7

(58) Field of Classification Search .................. 73/40.7
See application file for complete search history.

(56) References Cited

U.S. PATENT DOCUMENTS 3,485,085 A 12/1969 Hawkins, Jr.
3,977,233 A 8/1976 Issel
4,735,095 A * 4/1988 Issel ......................... 73/864.81
5,203,202 A * 4/1993 Spencer .................... 73/40.5 R
5,546,790 A 8/1996 Kudo et al.
5,589,647 A 12/1996 Jax et al.
5,992,217 A 11/1999 Jax et al.
6,865,941 B2 * 3/2005 Gibbs ...................... 73/40.5 R
6,967,183 B2 * 11/2005 Hampden-Smith et al. .. 502/101
7,138,159 B2 * 11/2006 Hampden-Smith et al. ....... 427/376.1
7,211,345 B2 * 5/2007 Hampden-Smith et al. .... 429/30
2003/0213300 A1 * 11/2003 Jax ........................... 73/432.1

FOREIGN PATENT DOCUMENTS

| | | |
|---|---|---|
| DE | 579 184 | 6/1933 |
| DE | 1 084 092 | 6/1960 |
| DE | 24 31 907 | 1/1976 |
| DE | 24 53 215 | 5/1976 |
| DE | 27 25 224 | 12/1978 |
| DE | 80 11 887 U1 | 7/1980 |
| DE | 42 42 806 A1 | 6/1994 |
| DE | 43 34 550 A1 | 4/1995 |

(Continued)

*Primary Examiner*—Hezron Williams
*Assistant Examiner*—Rodney T Frank
(74) *Attorney, Agent, or Firm*—Laurence A. Greenberg; Werner H. Stemer; Ralph E. Locher

(57) ABSTRACT

A collecting conduit for leakage monitoring and leakage location at an installation, includes a support pipe having openings. An outer surface of the support pipe is covered by a layer being permeable to a substance to be monitored, at least on a segment extending in longitudinal direction of the support pipe. An electrically conductive layer extends in longitudinal direction. The substance (L) can at least penetrate into the electrically conductive layer and the electrically conductive layer has an ohmic resistance dependent on the substance penetrating into it. An apparatus and a method for leakage monitoring and leakage location are also provided.

9 Claims, 2 Drawing Sheets

FOREIGN PATENT DOCUMENTS

| | | | | |
|---|---|---|---|---|
| DE | 196 43 637 | A1 | | 4/1998 |
| EP | 0 175 219 | | | 3/1986 |
| EP | 0 533 960 | B1 | | 3/1993 |
| RU | 2246706 | C2 | | 2/2005 |
| SU | 806 987 | | | 2/1981 |
| WO | WO 88/08967 | | | 11/1988 |
| WO | WO 93/00547 | | | 1/1993 |
| WO | WO 02/082036 | A1 | | 10/2002 |
| WO | WO 02082036 | A1 | * | 10/2002 |
| WO | 2004/063623 | A1 | | 7/2004 |

* cited by examiner

COLLECTING CONDUIT, APPARATUS AND METHOD FOR LEAKAGE MONITORING AND LEAKAGE LOCATION

CROSS-REFERENCE TO RELATED APPLICATIONS

This is a continuation, under 35 U.S.C. §120, of copending International Application No. PCT/EP2006/000994, filed Feb. 4, 2006, which designated the United States; this application also claims the priority, under 35 U.S.C. §119, of German Patent Application DE 10 2005 007 988.1, filed Feb. 22, 2005. The prior applications are herewith incorporated by reference in their entirety.

BACKGROUND OF THE INVENTION

Field of the Invention

The invention relates to a collecting conduit for leakage monitoring and leakage location at an installation. In addition, the invention relates to an apparatus and a method for leakage monitoring and leakage location at an installation, in which such a collecting conduit is used.

European Patent EP 0 175 219 B1, corresponding to U.S. Pat. No. 4,735,095, discloses a collecting conduit which is formed of a support pipe provided at its outer surface with a permeable layer through which a substance can diffuse that escapes into the environment of the collecting conduit from a leakage in the installation, for example a pipeline, and is to be detected. The support pipe is impermeable to the substance and is provided with openings, so that the substance can pass into the interior of the collecting conduit. The location at which the substance has penetrated into the collecting conduit is then determined by using a method disclosed by German Patent DE 24 31 907 C3, corresponding to U.S. Pat. No. 3,977,233. That location corresponds to a point at which the substance has escaped from the monitored installation part. To that end, the substance which has penetrated into the collecting conduit is directed together with a carrier gas located in the collecting conduit to a sensor which is likewise connected to the collecting conduit, through the use of a pump connected to the collecting conduit. If the flow velocity is known, the location at which the substance penetrates into the collecting conduit and thus the leakage location at the installation part, can be determined from the time interval between switching-on of the pump and the arrival of the substance at the sensor.

In order to be able to detect even small leakages with that known leakage-monitoring and leakage-locating apparatus, relatively long collecting times are necessary, which may be up to 24 hours. It is not until then that the substance to be detected has penetrated sufficiently into the collecting conduit so that, in view of the unavoidable longitudinal diffusion and the absorption taking place within the collecting conduit, it can be transported to the sensor over a longer section in a concentration necessary for detection. In particular, in the case of long collecting conduits, as are laid along pipelines, the carrier gas is therefore only transported at longer time intervals or scanning intervals, for example every 6 to 24 hours, through the collecting conduit, so that, between the occurrence of a leakage and its discovery, in the most unfavorable case, a period has passed which is composed of the time interval between two successive measurements and the time which the substance that has penetrated requires from the start of the pumping action until the arrival at the sensor. However, a period on the order of magnitude of many hours may involve considerable irreversible damage to both the installation and the environment, especially in the event of greater leakages.

In order to increase the response speed, i.e. in order to reduce the period (response time) between the occurrence of a leakage and its detection or location, it is in principle possible to use an apparatus for leakage monitoring as an alternative to or in addition to the known collecting conduit. That apparatus, due to the system, permits constant monitoring with a response time that is markedly reduced as a result, as proposed in International Publication No. WO 02/082036 A1 for example. There, in addition to the collecting conduit, an optical fiber is laid having transmission characteristics which are influenced by the substance and which is optically coupled to an optical transmitting and receiving device for measuring the transit time of backscattered light. With such an apparatus, although greater leakages can be detected in good time, that involves an increased outlay in terms of equipment. In addition, the known rapidly responding apparatuses for leakage monitoring can only be used for detecting greater leakages, since the detection sensitivity achieved with the known collecting conduit cannot be achieved with such apparatuses. It is therefore necessary to install two complete systems in-situ. That involves considerable expense.

SUMMARY OF THE INVENTION

It is accordingly an object of the invention to provide a collecting conduit for leakage monitoring and leakage location with which a period between an occurrence of a leakage and its detection or location can be reduced without additional installation cost. In addition, the object of the invention is to specify an apparatus for leakage monitoring and leakage location with such a collecting conduit. The object of the invention is also to specify a method for leakage monitoring and leakage location using such a collecting conduit, with which the period between leakage location and the occurrence of the leakage is reduced.

With the foregoing and other objects in view there is provided, in accordance with the invention, a collecting conduit for leakage monitoring and leakage location at an installation. The collecting conduit comprises a support pipe having openings and a longitudinal direction. A layer being permeable to a substance to be monitored covers an outer or inner surface of the support pipe, at least on a segment extending in the longitudinal direction of the support pipe. An electrically conductive layer into which the substance can at least penetrate extends in the longitudinal direction and has an ohmic resistance depending on the substance penetrating into the electrically conductive layer.

With such a collecting conduit, the occurrence of a substance escaping in the event of a leakage can be constantly monitored by a measurement of the resistance of the electrically conductive layer, which is sensitive to substances, between two measuring points that are far apart from one another. In other words, constant leakage monitoring which is independent of the times at which a pump connected to the collecting conduit is switched on, can be effected.

In accordance with another feature of the invention, the electrically conductive layer is made of a polymer material filled with carbon black. This permits especially cost-effective production of the electrically conductive layer that is sensitive to substances, since firstly a polymer material can be applied to the support pipe by an extrusion process without any problems and its electrical conductivity can be brought about by the filling with carbon black in an especially simple manner, and since secondly the electrical conductivity of a plastic filled with carbon black depends on swelling which takes place during the penetration of the substance and thus on the associated destruction of carbon black bridges.

In accordance with a further feature of the invention, a suitable polymer base material is, in particular, ethylene vinyl acetate EVA, which is both permeable to a multiplicity of substances and has sufficiently good electrical conductivity (low specific ohmic resistance) by admixing of carbon black, preferably between 20 and 25% by weight. It has surprisingly transpired in this case that the admixing of carbon black only reduces the permeability to a justifiable extent, if at all.

In accordance with an added feature of the invention, if the electrically conductive layer is permeable, it can completely cover the inner or outer surface of the support pipe. In this configuration, the electrically conductive layer may also be used to monitor the collecting conduit for mechanical destruction, for example for fracture.

In accordance with an additional feature of the invention, if the electrically conductive layer is surrounded by an electrically insulating layer which is permeable to the substance, slowing-down of the permeation rate caused by the admixing of carbon black is reduced, given adequate tightness of the collecting conduit, since the electrically conductive permeable layer need only have a thickness which is limited to the extent necessary for monitoring the electrical resistance or the electrical conductivity. In addition, the electrically conductive permeable layer is electrically insulated from the environment, so that the collecting conduit may also be laid in the earth or in contact with electrically conductive installation parts.

With the objects of the invention in view, there is also provided an apparatus for leakage monitoring and leakage location at an installation. The apparatus comprises a collecting conduit according to the invention, and a device for detecting an electrical resistance of the electrically conductive layer.

Due to the measurement of the electrical resistance of the electrically conductive layer, constant leakage monitoring is possible with little outlay in terms of equipment and with little metrological outlay.

With the objects of the invention in view, there is concomitantly provided a method for leakage monitoring and leakage location. The method comprises laying a collecting conduit according to the invention along a section, detecting an electrical resistance of an electrically conductive layer of the collecting conduit, using an increase in the resistance of the electrically conductive layer as a trigger for carrying out a measurement for leakage location, and during the measurement for leakage location, pumping a fluid carrier medium through the collecting conduit and analyzing the fluid carrier medium with a sensor for a substance escaping during the leakage.

In this method, the period between the occurrence of a leakage and the leakage location is reduced by using an increase in resistance as a trigger or tripping measure or a trigger signal for carrying out a measurement for leakage location, during which a fluid carrier medium is pumped through the collecting line and is analyzed by a sensor for a substance escaping during the leakage. Leakage location is therefore no longer effected only at firmly preset time intervals, but also when or only when the occurrence of a leakage is detected by the resistance measurement.

Other features which are considered as characteristic for the invention are set forth in the appended claims.

Although the invention is illustrated and described herein as embodied in a collecting conduit, an apparatus and a method for leakage monitoring and leakage location, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
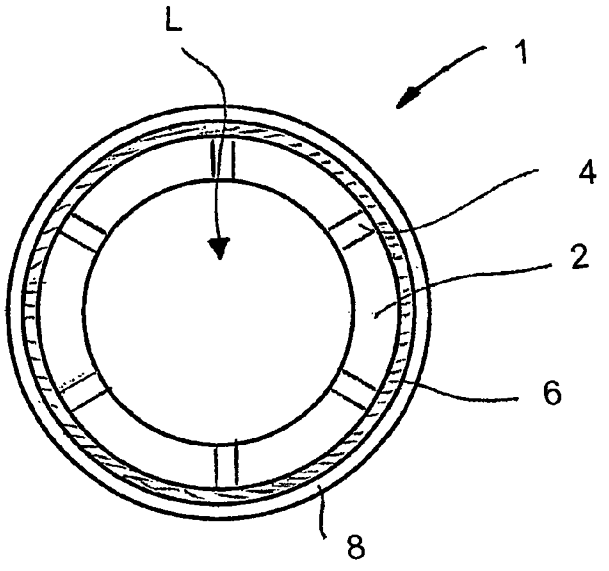
FIGS. 1-4 are diagrammatic, cross-sectional views each showing a collecting line according to the invention.

Referring now to the figures of the drawings in detail and first, particularly, to FIG. 1 thereof, there is seen a collecting conduit 1 which includes a support pipe 2, for example of PVC, that is provided with a multiplicity of radial openings 4. An electrically conductive layer 6, which is disposed on the support pipe 2, completely covers the support pipe 2 and is permeable to a substance L to be detected. The electrically conductive layer 6 is sensitive to substances, i.e. its (specific) electrical resistance depends on the presence of the substance L.

In the exemplary embodiment, the electrically conductive layer 6 is made of a polymer material filled with electrically conductive particles. This material is an electrically insulating polymer base material to which conductive particles, carbon black particles in the example, are admixed for bringing about electrical conductivity. The electrically conductive layer 6 is surrounded by an electrically nonconductive layer 8 which is likewise permeable to the substance and is preferably made of the same polymer base material.

The selection of a suitable polymer base material for the electrically conductive layer 6 depends on the substance L escaping in the event of a leakage and to be detected. In principle, all polymer base materials through which the substance L to be detected can pass on one hand and which experience a structural change, for example swelling, due to the substance L entering it in order to thus break up bridges between the electrically conductive particles and impair the electrical conductivity, based on these bridges, of the polymer material to which the conductive particles are added, are suitable.

The carbon black proportion required in practice depends on the polymer base material on one hand and on the length of the collecting conduit on the other hand, in order to achieve detectable electrical resistance values, for example within a range of a few MΩ, with little metrological outlay.

An especially suitable polymer base material for the detection of hydrocarbon compounds (in particular oils, gasoline, benzene) has proved to be ethylene vinyl acetate EVA. In the exemplary embodiment, the carbon black proportion in the electrically conductive layer 6 is between 20 and 25% by weight.

In the exemplary embodiment, the thicknesses of the respective coatings 6 and 8 is 0.5 mm.

In addition, the outer electrically insulating permeable layer 8 is surrounded by a non-illustrated permeable elastic protective braiding, which protects it from mechanical destruction.

Additionally, the support pipe 2 may be provided with a coating on its inner surface. This coating is made of a material which only has a low absorption capacity for the substance L in order to largely reduce signal damping produced by absorption in the support pipe 2 if there is a large distance between the leakage location and the detection sensor. This coating, for example made of Teflon PTFE, is applied to the inner surface before the radial openings are incorporated in the support pipe.

Figure 2:
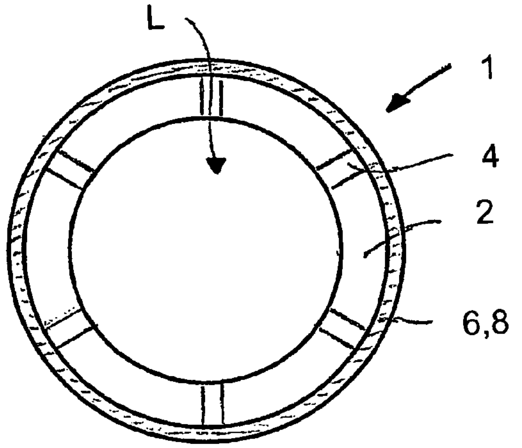

According to FIG. 2, a single-layer construction having only an electrically conductive layer 6 permeable to the substance L is provided, so that the layer 8 and the layer 6 form a functional unit.

In principle, if an electrically insulating permeable layer 8 completely surrounding the support pipe 2 is present, it is not absolutely necessary for the electrically conductive layer 6 to completely cover that layer 8. In the exemplary embodiment according to FIG. 3, the electrically conductive layer 6 is a strip-shaped section, extending in the longitudinal direction, of the permeable layer 8. In other words, the electrically conductive layer 6 and the permeable layer 8 are disposed next to one another on the support pipe 2. In this exemplary embodiment, it is also not absolutely necessary for the layer 6 to be permeable to the substance.

Figure 3:
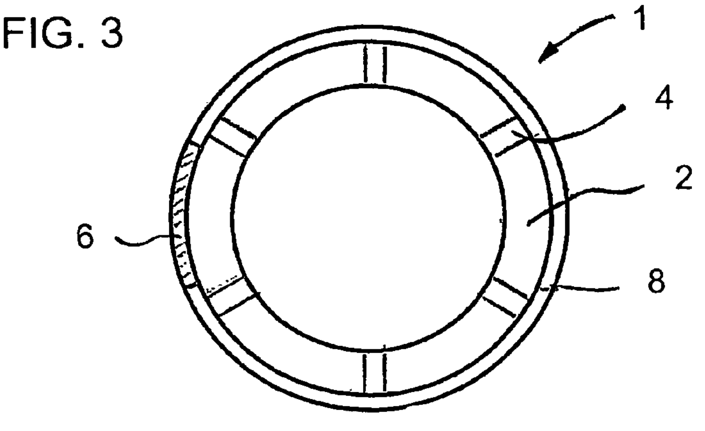

In the embodiments shown in FIGS. 2 and 3, the collecting conduit 1 is suitable for laying in an electrically insulating environment.

Figure 4:
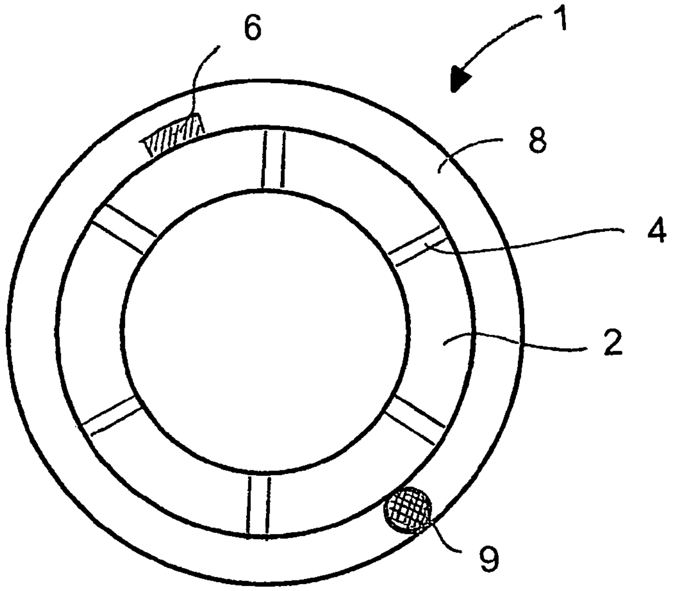

In an exemplary embodiment shown in FIG. 4, a strip-shaped electrically conductive layer 6 is embedded in the permeable layer 8 and is electrically insulated from the environment by the latter in order to enable it to be used in an electrically conductive environment. In addition, a return conductor 9, which is embedded in the layer 8, has an electrical resistance which is not affected by the substance L. This return conductor 9 is electrically connected at one end of the collecting conduit 1 to the layer 6 and enables its resistance to be measured. As is shown in the figure, the return conductor 9 may be an embedded wire. As an alternative thereto, it may also be formed by a strip-shaped electrically conductive layer.

Figure 5:
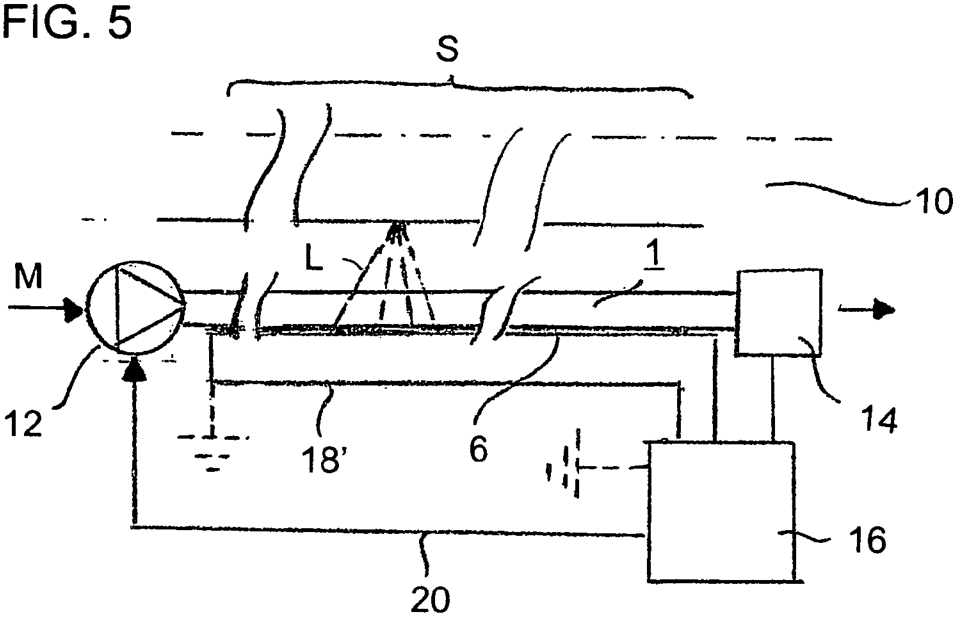
FIG. 5 is a schematic and diagrammatic illustration of an apparatus according to the invention.

According to FIG. 5, the collecting conduit 1 is laid along a pipeline 10 between a pump 12 and a sensor 14 for the substance to be detected. The electrical resistance of the electrically conductive layer 6 along a section s is measured constantly in an analyzing and control device 16, i.e. even when the pump 12 is not activated, i.e. when a fluid carrier medium M is stationary in the support pipe 2. In the example, a separate return conductor 18 is laid along the collecting conduit 1 for this purpose. If the resistance of the electrically conductive layer 6 exceeds a predetermined limit value as a result of a substance L (illustrated by broken lines) escaping into the environment of the collecting conduit 1 in the event of a leakage, a control signal 20 is generated in the analyzing and control device 16. This signal 20 starts up the pump 12 and enables leakage location to be carried out according to the known methods explained at the outset herein.

Depending on the location at which the collecting conduit is laid, there may also be no need to have a separate return conductor 18 or a return conductor 9 (FIG. 4) integrated in the collecting conduit 1. Instead, a ground contact, for example, may be produced at the end point of the section, as is illustrated by broken lines in the figure.

I claim:

1. A collecting conduit for leakage monitoring and leakage location at an installation, the collecting conduit comprising:

a support pipe having openings, an outer surface, an interior and a longitudinal direction;

a layer being permeable to a substance to be monitored and allowing the substance to pass into said interior of said support pipe through said openings, said layer covering said outer surface of said support pipe, at least on a segment extending in said longitudinal direction of said support pipe; and an electrically conductive layer into which the substance can at least penetrate, said electrically conductive layer extending in said longitudinal direction and having an ohmic resistance depending on the substance penetrating into said electrically conductive layer.

2. The collecting conduit according to claim 1, wherein said electrically conductive layer is made of a polymer material filled with carbon black.

3. The collecting conduit according to claim 2, wherein said polymer material is EVA.

4. The collecting conduit according to claim 3, wherein said carbon black has a concentration of between 20 and 25 percent by weight.

5. The collecting conduit according to claim 1, wherein said electrically conductive layer is disposed on said outer surface of said support pipe.

6. The collecting conduit according to claim 5, wherein said layer being permeable to the substance to be monitored is an electrically insulating layer surrounding said electrically conductive layer and covering said support pipe.

7. The collecting conduit according to claim 1, wherein said electrically conductive layer completely covers said outer surface of said support pipe and is permeable to the substance.

8. An apparatus for leakage monitoring and leakage location at an installation, the apparatus comprising:

a collecting conduit according to claim 1; and a device for detecting an electrical resistance of the electrically conductive layer.

9. A method for leakage monitoring and leakage location, the method comprising the following steps:

laying a collecting conduit according to claim 1 along a section;

detecting an electrical resistance of an electrically conductive layer of the collecting conduit;

using an increase in the resistance of the electrically conductive layer as a trigger for carrying out a measurement for leakage location; and during the measurement for leakage location, pumping a fluid carrier medium through the collecting conduit and analyzing the fluid carrier medium with a sensor for a substance escaping during the leakage.

* * * * *